(12) United States Patent
Maurice

(10) Patent No.: US 9,432,624 B2
(45) Date of Patent: Aug. 30, 2016

(54) METHOD FOR IMPROVING AN MCU'S PERFORMANCE USING COMMON PROPERTIES OF THE H.264 CODEC STANDARD

(71) Applicant: ClearOne Communications Hong Kong Ltd., Causeway Bay (HK)

(72) Inventor: Oren J. Maurice, Yoqneam Moshava (IL)

(73) Assignee: ClearOne Communications Hong Kong Ltd., Hong Kong (HK)

(*) Notice: Subject to any disclaimer, the term of this patent is extended or adjusted under 35 U.S.C. 154(b) by 0 days.

(21) Appl. No.: 14/583,981

(22) Filed: Dec. 29, 2014

(65) Prior Publication Data

US 2015/0208037 A1    Jul. 23, 2015

Related U.S. Application Data

(60) Provisional application No. 61/923,248, filed on Jan. 3, 2014, provisional application No. 61/935,545, filed on Feb. 4, 2014.

(51) Int. Cl.
| | | |
|---|---|---|
| *H04N 7/15* | (2006.01) | |
| *H04L 29/06* | (2006.01) | |
| *H04N 19/70* | (2014.01) | |

(52) U.S. Cl.
CPC .......... *H04N 7/152* (2013.01); *H04L 65/4046* (2013.01); *H04L 65/605* (2013.01); *H04L 65/607* (2013.01); *H04N 19/70* (2014.11)

(58) Field of Classification Search
CPC ...... H04N 7/152; H04N 19/40; H04N 19/70; H04N 19/176; H04L 65/403; H04L 65/607

USPC ...... 348/14.08, 14.09, 14.13, 452, 447, 513; 375/240.1, 240, 240.08, 240.16, 375/240.26; 382/243, 156, 233; 725/62
See application file for complete search history.

(56) References Cited

U.S. PATENT DOCUMENTS

| | | | | |
|---|---|---|---|---|
| 6,160,586 | A * | 12/2000 | Justiss ................. | H04N 19/105 348/452 |
| 7,068,847 | B1 * | 6/2006 | Chen ..................... | H04N 19/60 345/536 |
| 7,206,456 | B2 * | 4/2007 | Hannuksela ......... | H04N 19/174 348/384.1 |
| 7,253,831 | B2 * | 8/2007 | Gu ........................ | H04N 7/152 348/14.09 |
| 7,302,001 | B2 * | 11/2007 | Wang ................... | H04N 19/105 375/240.1 |
| 7,983,335 | B2 * | 7/2011 | Vajhallya ............. | G06F 17/147 375/340 |
| 8,121,191 | B1 * | 2/2012 | Haskell ................ | H04N 19/597 370/395.2 |
| 8,436,889 | B2 * | 5/2013 | Eleftheriadis ........ | H04N 7/152 348/14.09 |
| 2005/0024487 | A1 * | 2/2005 | Chen .................... | H04N 19/172 348/14.13 |

(Continued)

*Primary Examiner* — Gerald Gauthier
(74) *Attorney, Agent, or Firm* — Matthew J. Booth & Associates PLLC; Matthew J. Booth

(57) ABSTRACT

This disclosure describes an apparatus (106) for improving performance of a multipoint control unit (210). The apparatus (106) provides a video stream manipulator (208) and a multipoint control unit (210). The video stream manipulator (208) may encode one or more video streams in a predetermined video codec standard separately. Each of the encoded video streams includes at least one encoded video frame made of a plurality of macroblocks, where the macroblocks are segregated into a predetermined number of macroblock lines. The multipoint control unit (210) may assemble predetermined number of macroblock lines from each of the encoded video streams in a predetermined composition.

20 Claims, 6 Drawing Sheets

(56) References Cited

U.S. PATENT DOCUMENTS

| | | | | |
|---|---|---|---|---|
| 2005/0278749 A1* | 12/2005 | Ewert | ............... | H04L 12/58 725/62 |
| 2008/0037864 A1* | 2/2008 | Zhang | ............... | H04N 17/004 382/156 |
| 2008/0043090 A1* | 2/2008 | Wiener | ............... | H04N 7/152 348/14.09 |
| 2008/0043832 A1* | 2/2008 | Barkley | ............... | H04N 21/234327 375/240 |
| 2009/0067494 A1* | 3/2009 | Sodagar | ............... | H04N 19/176 375/240.08 |
| 2010/0040148 A1* | 2/2010 | Marpe | ............... | H04N 19/176 375/240.16 |
| 2011/0026608 A1* | 2/2011 | Luthra | ............... | H04N 21/2365 375/240.26 |
| 2012/0013705 A1* | 1/2012 | Taylor | ............... | H04L 12/1818 348/14.08 |
| 2014/0118473 A1* | 5/2014 | Halavy | ............... | H04N 7/152 348/14.09 |
| 2014/0267576 A1* | 9/2014 | Hiller | ............... | H04L 12/1827 348/14.09 |
| 2015/0208037 A1* | 7/2015 | Maurice | ............... | H04N 7/152 348/14.09 |
| 2015/0304526 A1* | 10/2015 | Maurice | ............... | H04N 21/4307 348/513 |
| 2016/0065889 A1* | 3/2016 | Maurice | ............... | H04N 5/04 348/447 |

* cited by examiner

METHOD FOR IMPROVING AN MCU'S PERFORMANCE USING COMMON PROPERTIES OF THE H.264 CODEC STANDARD

CROSS REFERENCE TO RELATED APPLICATIONS

This application claims priority and the benefits of the earlier filed Provisional U.S. Application No. 61/923,248, filed 3 Jan. 2014, which is incorporated by reference for all purposes into this specification.

Additionally, this application claims priority and the benefits of the earlier filed Provisional U.S. Application No. 61/935,545, filed 4 Feb. 2014, which is incorporated by reference for all purposes into this specification.

TECHNICAL FIELD

This disclosure relates to video data processing techniques. More specifically, the disclosure relates to an apparatus for improving performance of a multipoint control unit (MCU) and related methods.

BACKGROUND ART

Various applications such as video surveillance and news broadcast require multiple video streams to be displayed simultaneously on a single terminal device. Such video streams may be encoded in a diversity of video encoding standards and are often processed by a central unit such as multipoint control unit (MCU) before being transmitted to an intended terminal device such as a display screen, mobile phone, or a television. For example, in a video conference session involving communication between two or more participants, the MCU processes encoded video streams from the participants, and returns a dedicated re-encoded video stream in a predefined video codec standard such as H.264, also known as Moving Pictures Experts Group-4 (MPEG-4) Part 10 or MPEG-4 Advanced Video Coding (AVC), to each participant.

In the H.264/AVC standard, a video includes a series of pictures (or frames), with each frame consisting of a two-dimensional array of pixels. The pixels are divided into macroblocks (a 16×16 array of pixels). Each macroblock has a macroblock number; in general, the macroblocks are numbered starting at the top-left of the frame, in increasing order from left-to-right and top-to-bottom. The macroblocks can be grouped into slices, and the slices can be grouped into slice groups. Macroblocks within a slice are arranged in ascending order by macroblock number. A slice can include any number of macroblocks, which may or may not be contiguous; that is, macroblocks in one slice may be interspersed among macroblocks of one or more other slices of other slice groups; however, macroblocks from slices in the same slice group are not interspersed with each other. H.264 has a feature referred to as flexible macroblock ordering (FMO) that allows macroblocks to be grouped into slices.

FMO is one of the error resiliency tools that can be used by a decoder to conceal errors if slices are lost or corrupted during transmission. Macroblocks in a missing or corrupted slice can be reconstructed by interpolating or extrapolating macroblock information from another slice. More specifically, a correctly received slice can be decoded, and the information in that slice can be used to derive information for another slice.

Another H.264 feature is generally referred to as arbitrary slice ordering (ASO). With ASO, slices can be transmitted in any order. For example, a slice may be sent as soon as it is ready, that is, a slice may be streamed to a decoder as soon as all of the macroblocks, which make up that slice are encoded. As a result, a slice from one slice group may be sent, followed by a slice from another slice group, followed by another slice from the first slice group, and so on. Yet another feature of the H.264/AVC standard allows the MCU to implement the FMO and the ASO in combination with each other to generate an encoded video stream.

Typically, the MCU encodes video streams from multiple participants either separately or as a combined, encoded single video stream. Although the single video stream saves on the MCU computing cost, user experiences a lag in his own video at the terminal device. Therefore, the MCU usually encodes video streams from each participant separately to optimize the user experience, which increases the MCU processing or computing cost. Therefore, there exists a need for a solution that improves the MCU performance to optimally handle multiple video streams encoded in different video codec standards.

SUMMARY OF INVENTION

This disclosure describes an apparatus for improving performance of a multipoint control unit (MCU).

One embodiment of the present disclosure includes an apparatus for improving performance of a multipoint control unit. The apparatus comprises a video stream manipulator and a multipoint control unit. The video stream manipulator may be configured to encode one or more video streams in a predetermined video codec standard separately. Each of said encoded one or more video streams includes an encoded video frame made of a plurality of macroblocks. Each of said plurality of macroblocks may be segregated into a predetermined number of macroblock lines. The multipoint control unit may be configured to assemble said predetermined number of macroblock lines from each of said encoded one or more video streams in a predetermined composition.

Another embodiment of the present disclosure includes a method to use an apparatus for improving performance of a multipoint control unit. The method comprises encoding one or more video streams in a predetermined video codec standard separately with a video stream manipulator, wherein each of said encoded one or more video streams comprises an encoded video frame made of a plurality of macroblocks, each of said plurality of macroblocks being segregated into a predetermined number of macroblock lines; and assembling said predetermined number of macroblock lines from each of said encoded one or more video streams in a predetermined composition with said multipoint control unit.

Yet another embodiment of the present disclosure includes a method to manufacture an apparatus for improving performance of a multipoint control unit. The method comprises providing a video stream manipulator configured to encode one or more video streams in a predetermined video codec standard separately, wherein each of said encoded one or more video streams comprises an encoded video frame made of a plurality of macroblocks, each of said plurality of macroblocks being segregated into a predetermined number of macroblock lines; and providing said multipoint control unit configured to assemble said predetermined number of macroblock lines from each of said encoded one or more video streams in a predetermined composition.

Still another embodiment of the present disclosure includes a non-transitory program storage device readable by a computing device that tangibly embodies a program of instructions executable by said computing device to perform a method for improving performance of a multipoint control unit. The method comprises encoding one or more video streams in a predetermined video codec standard separately with a video stream manipulator, wherein each of said encoded one or more video streams comprises an encoded video frame made of a plurality of macroblocks, each of said plurality of macroblocks being segregated into a predetermined number of macroblock lines; and assembling said predetermined number of macroblock lines from each of said encoded one or more video streams in a predetermined composition with said multipoint control unit.

Other and further aspects and features of the disclosure will be evident from reading the following detailed description of the embodiments, which are intended to illustrate, not limit, the present disclosure.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

Figure 1A:
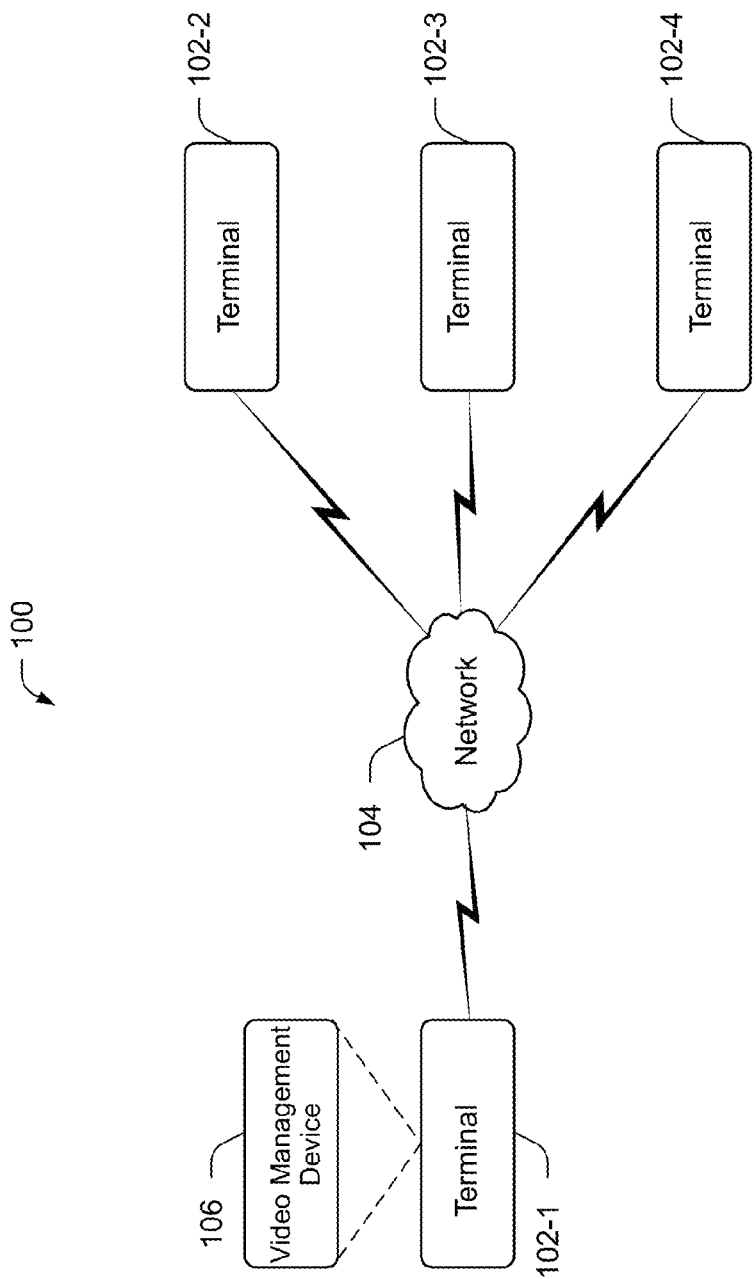
FIG. 1A illustrates a first network environment implementing an exemplary video management device 106, in accordance with an embodiment of the present disclosure.

This disclosure describes an apparatus for improving an MCU's performance using inherent feature(s) of a video codec standard. This disclosure describes numerous specific details in order to provide a thorough understanding of the present invention. One ordinarily skilled in the art will appreciate that one may practice the present invention without these specific details. Additionally, this disclosure does not describe some well-known items in detail in order not to obscure the present invention.

Non-Limiting Definitions

In various embodiments of the present disclosure, definitions of one or more terms that will be used in the document are provided below.

An "endpoint" is used in the present disclosure in the context of its broadest definition. The endpoint refers to one or more computing devices capable of establishing a communication channel for exchange of at least video streams in a communication session. Examples of the computing devices may comprise, but are not limited to, a desktop PC, a personal digital assistant (PDA), a server, a mainframe computer, a mobile computing device (e.g., mobile phones, laptops, tablets, etc.), an internet appliance, calling devices (e.g., an internet phone, video telephone, etc.).

An "aspect ratio" is used in the present disclosure in the context of its broadest definition. The Aspect ratio may be defined as a ratio of width to length of a display screen operatively connected to the endpoint.

The numerous references in the disclosure to the video management device are intended to cover any and/or all devices capable of performing respective operations on the endpoints in a conferencing environment relevant to the applicable context, regardless of whether or not the same are specifically provided.

Embodiments are disclosed in the context of environments that represent a multipoint video conference among multiple users via respective endpoints capable of receiving, decoding, or rendering video streams. Other embodiments may be applied in the context of other scenarios (e.g., broadcast video, news broadcasts, video surveillance, digital signage etc.) involving mixing of different video streams from one or more endpoints to render a composite video stream of different compositions. Such embodiments include a video management device 106 configured to improve performance of a multipoint control unit (MCU) using inherent features of video codec standards that support non-standard slice shapes (or sequences of macroblocks) in a picture or video frame of a video stream. The video management device 106 includes an MCU configured for processing video data using a predetermined video codec standard in combination with a video stream manipulator that uses encoded-realm composition, rather than raw-bitmap realm composition, for generating an output frame, thus saving a considerable amount of computing power on re-encoding the same video frame in multiple layouts for multiple users. The video management device 106 encodes video frames, which may be pre-scaled, from all sources separately and slices the encoded macroblocks in the pre-scaled frames at bit-level into macroblock lines. The macroblock lines may be assembled into final scan-lines of various desired output compositions through bit-shifting to adjust for a macroblock line that begins at a bit, which is not at a byte-boundary.

FIG. 1A illustrates a first network environment implementing an exemplary video management device 106, in accordance with an embodiment of the present disclosure. The network environment 100 includes multiple endpoints including terminals 102-1, 102-2, 102-3, and 102-4 (collectively, terminals 102). Examples of the terminals 102 may include a video appliance (e.g., a video monitor, etc.), a personal digital assistant (PDA), a desktop personal computer (PC), a mobile computing device (e.g., notebook, laptop, mobile phone, etc.), a television device, a set-top box (STB), cellular phone, video phone, or any other device, component, element, or object capable of receiving, decoding, or rendering video streams encoded in a variety of known, related art, or later developed video codec standards including H.264, H.265, MPEG1, MPEG2, and VP8. Each of the terminals 102 may communicate respective video streams to one or more of the other terminals 102 via a network 104.

The network 104 may comprise, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/ or any other delivery or tunneling mechanism for carrying data. The network 104 may comprise multiple networks or sub-networks, each of which may comprise, for example, a wired or wireless data pathway. The network 104 may comprise a circuit-switched voice network, a packet-switched data network, or any other network that is able to carry electronic communications. For example, the network 104 may comprise networks based on the Internet protocol (IP) or asynchronous transfer mode (ATM), and may support voice using, for example, VoIP, Voice-over-ATM, or other comparable protocols used for voice data communications. In some embodiments, the network 104 may comprise a cellular telephone network configured to enable exchange of at least video data, independently or in combination with textual data and audio data between at least two of the terminals 102.

The terminals 102 may comprise or be coupled with one or more hardware devices either wirelessly or in a wired fashion for enabling a user to dynamically interact with other users via the network 104. For example, the terminals 102 may be coupled with an imaging device (not shown) including, but are not limited to, a video camera, a webcam, a scanner, or any combination thereof, and an audio device (not shown) including, but are not limited to, a speaker, a microphone, or any combination thereof. The terminals 102 may be compatible with any other device (not shown) connected to the network 104 to exchange at least audio, video, textual or symbolic data streams with each other or any other compatible devices.

In one embodiment, an endpoint such as the terminal 102-1 may be coupled to, integrated, or in communication with a video management device 106 configured to, at least one of: (1) establish a communication bridge or channel between the terminals 102; (2) receive, decode, manipulate, or encode multiple video streams; (3) scale or resize a frame of the video streams received from each of the terminals 102 for the resized frame being compatible with a supported resolution of a target terminal such as a terminal 102-2; (4) compress the encoded, resized video frame into a predetermined sequences of macroblocks (also referred to as macroblock lines or slices), e.g., relative to the aspect ratio of a display screen of the target terminal; (5) store and manage video data corresponding to the received video streams; and (6) request services from or deliver services to, or both, various devices connected to the network 104. Other embodiments may include the video management device 106 being coupled to, integrated, or in communication with one or more of the other terminals 102.

The video management device 106 may represent any of a wide variety of devices capable of providing video processing optimization services to the network devices. The video management device 106 may be implemented as a standalone and dedicated device including hardware and installed software, where the hardware is closely matched to the requirements and/or functionality of the software. Alternatively, the video management device 106 may be implemented as a software application or a device driver on existing hardware devices such as a multipoint control unit. The video management device 106 may enhance or increase the functionality and/or capacity of the network, such as the network 104, to which it is connected. In some embodiments, the video management device 106 may be configured, for example, to perform e-mail tasks, security tasks, network management tasks including IP address management, and other tasks. In some other embodiments, the video management device 106 may be configured to expose its computing environment or operating code to a user, and may include related art I/O devices, such as a keyboard or display. The video management device 106 of some embodiments may, however, include software, firmware, or other resources that support remote administration and/or maintenance of the video management device 106.

In further embodiments, the video management device 106 either in communication with any of the networked devices such as the terminals 102, or independently, may have video, voice, and data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the video management device 106 may comprise or implement one or more real time protocols (e.g., session initiation protocol (SIP), H.261, H.263, H.264, H.323, etc.) and non-real time protocols known in the art, related art, or developed later to facilitate communication of video streams between the terminals 102, the video management device 106, or any other network device.

In some embodiments, the video management device 106 may be configured to convert communications, which may include instructions, queries, data, etc., from the terminals 102 into appropriate formats to make these communications compatible with the terminals 102, and vice versa. Consequently, the video management device 106 may allow implementation of the terminals 102 using different technologies or by different organizations, e.g., a third-party vendor, managing the terminals 102 or associated services using a proprietary technology.

Figure 1B:
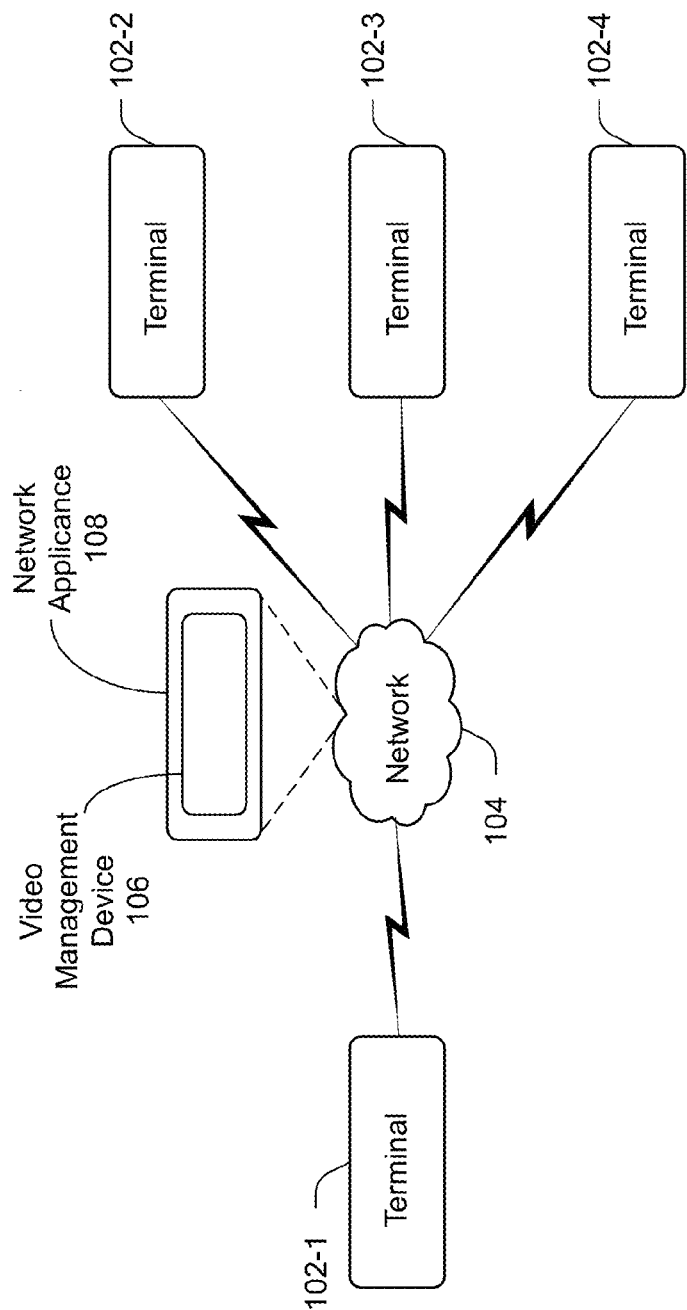
FIG. 1B illustrates a second network environment implementing the video management device 106 of FIG. 1A, in accordance with an embodiment of the present disclosure.

FIG. 1B provides the video management device 106 installed on or integrated with any network appliance 108 configured to establish the network 104 among the terminals 102 (102-1, 102-2, 102-3, and 102-4). At least one of the video management device 106 and the network appliance 108 may be capable of operating as or providing an interface to assist exchange of software instructions and data among the terminals 102, and the video management device 106. In some embodiments, the network appliance 108 may be preconfigured or dynamically configured to include the video management device 106 integrated with other devices. For example, the video management device 106 may be integrated with the terminal 102-1 (as shown in FIG. 1A) or any other endpoint (not shown) connected to the network 104. The terminal 102-1 may include a module (not shown), which enables that the terminal 102-1 being introduced to the network appliance 108, thereby enabling the network appliance 108 to invoke the video management device 106 as a service. Examples of the network appliance 108 may include, but are not limited to, a DSL modem, a wireless access point, a set-top box (STB), a router, a base station, and a gateway having a predetermined computing power sufficient for implementing the video management device 106.

In yet another embodiment, the terminals 102 may be configured to interact with each other via a server (not shown) over the network 104. The server may be installed, integrated, or operatively associated with the video management device 106. The server may be implemented as any of a variety of computing devices including, for example, a general purpose computing device, multiple networked servers (arranged in clusters or as a server farm), a mainframe, or so forth.

Figure 2:
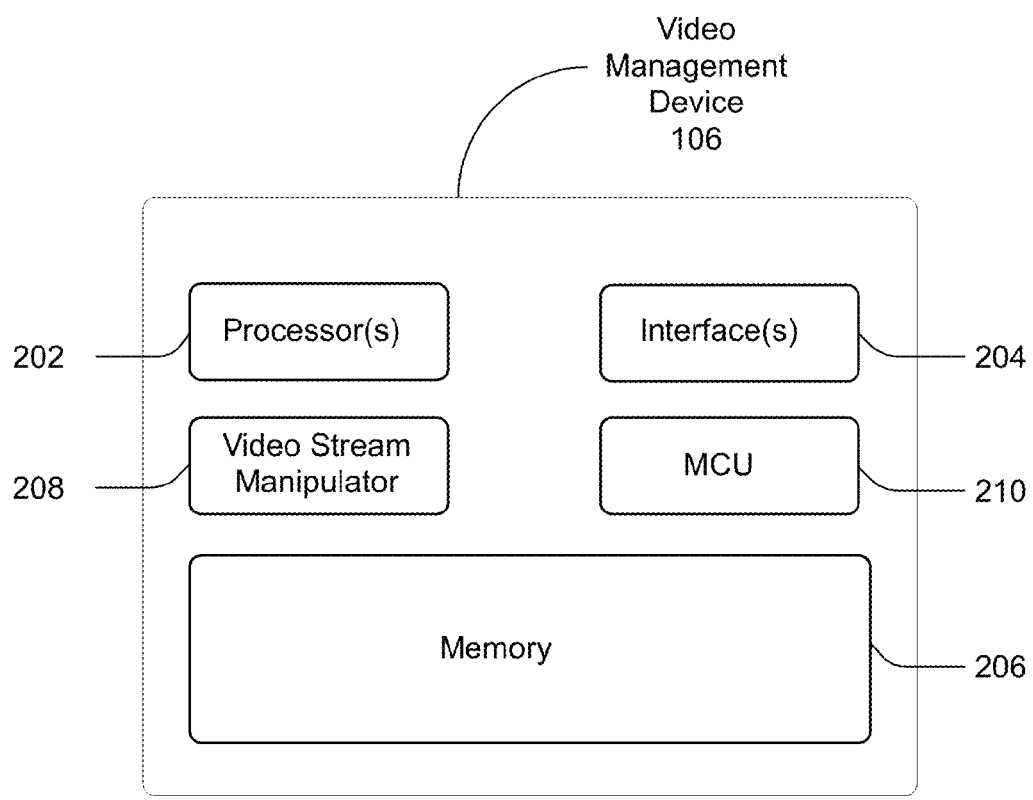
FIG. 2 illustrates the exemplary video management device 106 of FIG. 1A, in accordance with an embodiment of the present disclosure.

FIG. 2 illustrates the exemplary video management device of FIG. 1A, in accordance with an embodiment of the present disclosure. The video management device 106 may be implemented as a single device (e.g., a computing device, a processor or an electronic storage device) or a combination of multiple devices that are operatively connected or networked together. The video management device 106 may be implemented in hardware or a suitable combination of hardware and software. In some embodiments, the video management device 106 may be a hardware device including processor(s) 202 executing machine readable program instructions for handling video streams received from the terminals 102. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) 202 may include, for example, microprocessors, microcomputers, microcontrollers, digital signal processors, central processing units, state machines, logic circuits, and/or any devices that manipulate signals based on operational instructions. Among other capabilities, the processor(s) 202 may be configured to fetch and execute computer readable instructions in a memory associated with the video management device 106 for performing tasks such as signal transcoding, data processing, input/output processing, power control, and/or other functions.

In some embodiments, the video management device 106 may include, in whole or in part, a software application working alone or in conjunction with one or more hardware resources. Such software applications may be executed by the processor(s) 202 on different hardware platforms or emulated in a virtual environment. Aspects of the video management device 106 may leverage known, related art, or later developed off-the-shelf software. Other embodiments may comprise the video management device 106 being integrated or in communication with a mobile switching center, network gateway system, Internet access node, application server, IMS core, service node, or some other communication systems, including any combination thereof. In some embodiments, the video management device 106 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The video management device 106 may include a variety of known, related art, or later developed interface(s) 204, including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

The video management device 106 may further include a system memory 206, a video stream manipulator 208, and a multipoint control unit (MCU) 210. The system memory 206 may store at least one of (1) video data such as spatial data (e.g., picture width, picture height, luminance and chrominance values of each picture pixel, etc.) and motion data (e.g., frame rate, sequence frame number, end of stream flag, motion vectors, pointers to locations of different components in a picture such as pixels, macroblocks (MBs), slices, slice groups, and so on, including other related attributes such as MB mode, MB type, MB motion type, etc.) corresponding to each video frame in a video stream; and (2) a log of profiles of network devices and associated communications including instructions, queries, conversations, data, and related metadata.

The system memory 206 may comprise any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. In some embodiments, the system memory 206 may include one or more databases, which may be sub-divided into further databases for storing electronic files. The system memory 206 may have one of many database schemas known in the art, related art, or developed later for storing video data from the terminals 102 via the video management device 106. For example, a database may have a relational database schema involving a primary key attribute and one or more secondary attributes. In some embodiments, the video management device 106 may perform one or more operations, but not limited to, reading, writing, indexing, encoding, decoding, manipulating and updating the video data, and may communicate with various networked computing devices such as the terminals 102 and the network appliance 108.

In one embodiment, the video stream manipulator 208 may operate in communication with the MCU 210 and exchange data including, but not limited to, that corresponding to each frame of the video stream and the terminals 102. The video stream manipulator 208 may be configured to at least one of (1) decode an encoded video stream received from one or more of the terminals 102; (2) resize one or more video frames in the decoded video stream into a predetermined resolution compatible with a target terminal; (3) encode resized video frames using a predetermined video codec standard that supports non-standard sequencing of macroblocks (or slices) in the encoded video frames; and (4) compress each of the encoded video frames that construct the video stream from an input terminal such as the terminal 102-1 into a predetermined sequence of macroblocks (or slices), e.g., relative to the aspect ratio of a display screen of a target terminal such as the terminal 102-2.

The MCU 210 may be configured to implement various real-time and non-real time communication protocols for rendering one or more video streams either separately or as a combined or composite video stream to one or more of the terminals 102. In some embodiments, the MCU 210 may be configured to determine various characteristics of the endpoints such as the terminals 102 for handling the respective received video streams. The characteristics may comprise, but are not limited to, type of endpoint (e.g., a mobile phone, a laptop, an television, a video display, etc.); supported video resolution(s), aspect ratio, and supported codecs of the terminals 102; network connection speed, and so on.

In some embodiments, the MCU 210 may be configured to switch between various video streams received from different terminals to either continuously display a received video stream while operating in a continuous presence mode, or tile a video stream received from each of the terminals 102 on that terminal from which a respective audio stream is actively received while the MCU 210 is operating in a voice-switched mode. In the voice-switched mode, the MCU 210 may be configured to assemble the compressed predetermined sequence of macroblocks or slices related to each of the terminals 102 by mapping the corresponding byte-arrays for generating a composite video stream having different video streams tiled at different locations respective to each terminal receiving the composite video stream.

Figure 3A:
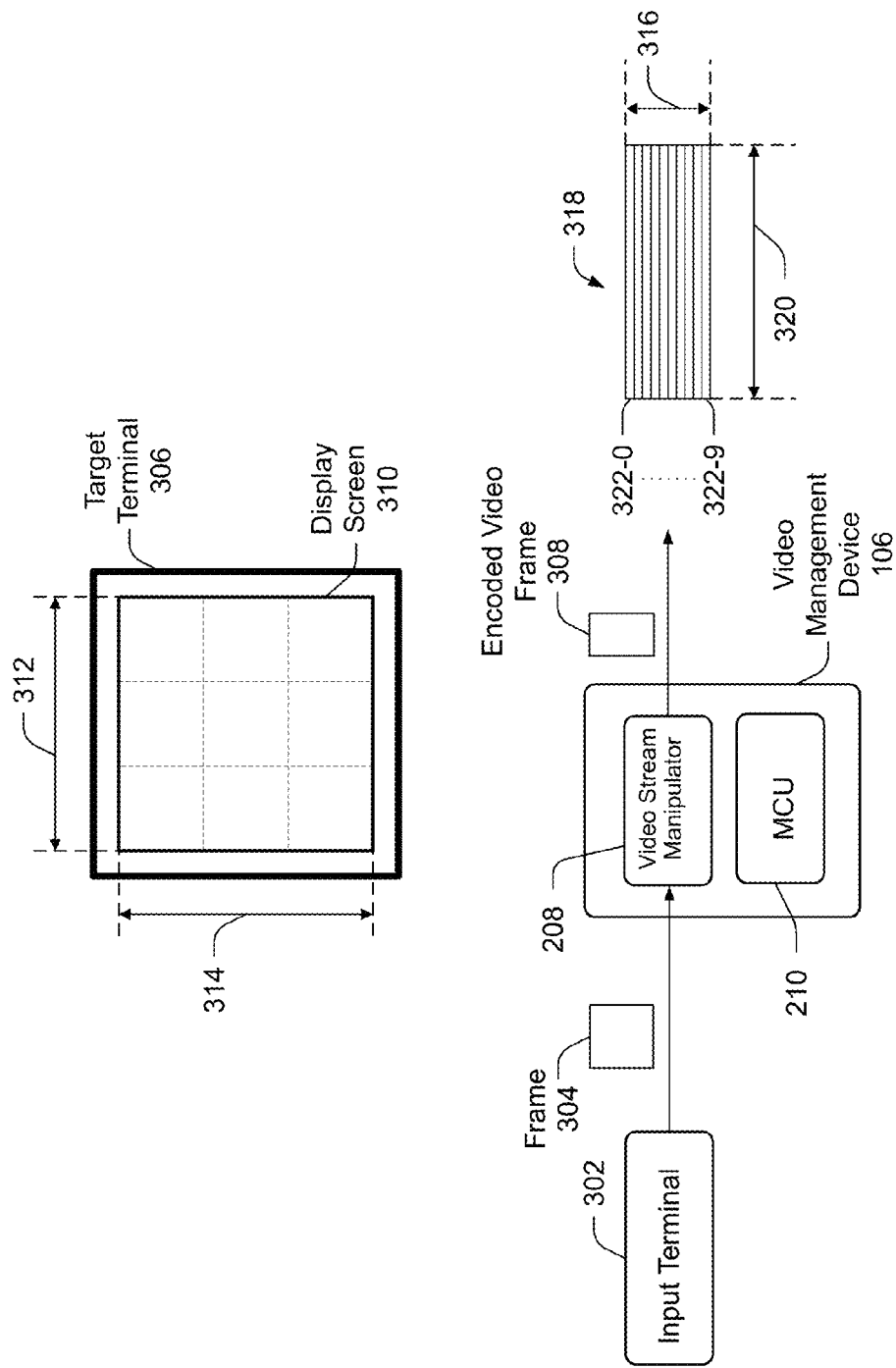
FIGS. 3A and 3B are schematics illustrating implementation of the video management device 106 of FIG. 1A, in accordance with an embodiment of the present disclosure.
Figure 3B:
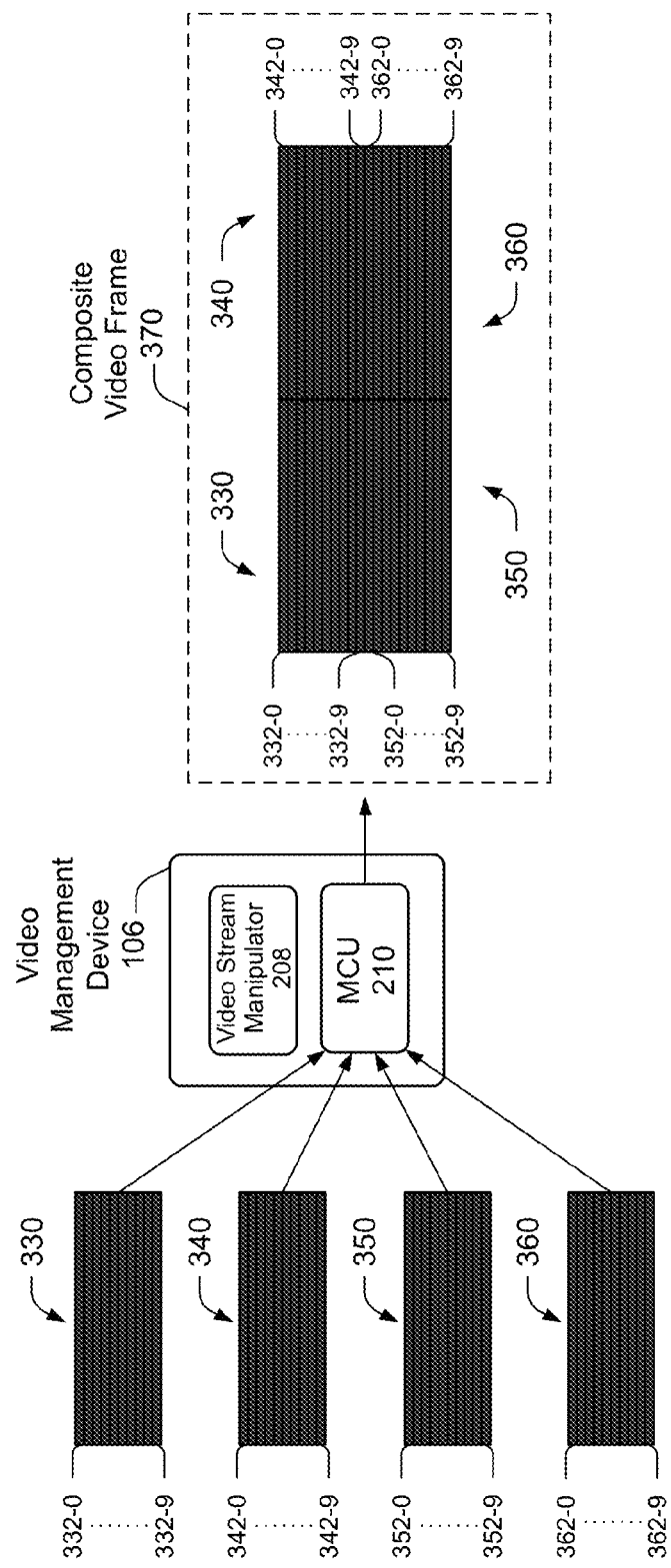

FIGS. 3A and 3B are schematics illustrating implementation of the video management device of FIG. 1A, in accordance with an embodiment of the present disclosure. In one embodiment, the video management device 106 may receive a video stream from each of the terminals 102 via the interface(s) 204 (of FIG. 2) for being manipulated to optimize the MCU performance. A single input terminal 302 is shown in FIG. 3A for explaining the operation of the video management device 106. However, similar operation may be performed for each of the endpoints such as the terminals 102, each behaving as a video source to provide an encoded video stream to the video management device 106.

The input terminal 302 may provide a video stream including multiple video frames such as a frame 304 encoded in any of the known, related art, or later developed video codec standards such as the MPEG and the H.264/AVC standards. The video stream manipulator 208 may receive and decode the encoded video stream from the input terminal 302. Each video frame (not shown) in the decoded video stream may be resized or scaled by the video stream manipulator 208 to a resolution that is supported by a target terminal 306. In one embodiment, the video stream manipulator 208 may be configured to encode each of the scaled video frames constructing the video stream using a predetermined video codec standard that supports non-standard or desired sequencing of macroblocks (or slice shapes) in the scaled video frames. Examples of such standards include, but are not limited to, H.264, H.265, and Scalable Video Coding (SVC) standards.

In the above embodiment, the video stream manipulator 208 may be further configured to segregate the encoded macroblocks in the encoded video frames, such as an encoded video frame 308, at bit level into macroblock lines or slices. All the segregated macroblock lines or slices that collectively construct a particular video frame are compressed into a predetermined sequence of macroblocks (or macroblock lines or slices), thereby reducing the size of the encoded video frame relative to an aspect ratio of a display screen 310 of the target terminal 306.

In one example, the display screen 310 of the target terminal 306 may have length 312 and width 314 being 60 inches and 30 inches respectively, thereby having an aspect ratio of 0.5. The video stream manipulator 208 may compress the encoded resized video frame to one-third of the dimensions of the display screen 310 to increase the aspect ratio of the encoded resized video frame relative to the aspect ratio of the display screen 310. In other words, the width 316 of the compressed encoded video frame 318 may be reduced from 30 inches to 10 inches while keeping the length 320 same as that of the display screen 310 to increase the aspect ratio of the compressed frame 318 to six. The compressed frame 318 may include all the macroblock lines (or slices) such as macroblock lines 322-0, 322-1, 322-3, . . . , 322-9 (collectively macroblock lines or slices 322) that construct the originally encoded video frame 308. The video stream manipulator 208 may be configured to encode only those macroblock lines such as the macroblock lines 322 that are within a compressed frame such as the compressed frame 318 based on a predetermined aspect ratio of the compressed frame relative to the aspect ratio of the display screen 310.

FIG. 3B is a schematic that illustrates compressed frames 330, 340, 350, and 360 corresponding to video streams from the terminals 102-1, 102-2, 102-3, and 102-4 respectively being assembled by the video management device 106 to output a composite video stream.

The compressed frame 330 may include multiple macroblock lines (or slices) 332-0, 332-1, . . . , 332-9 (collectively, macroblock lines or slices 332); the compressed frame 340 may include multiple macroblock lines (or slices) 342-0, 342-1, . . . , 342-9 (collectively, macroblock lines or slices 342); the compressed frame 350 may include multiple macroblock lines (or slices) 352-0, 352-1, . . . , 352-9 (collectively, macroblock lines or slices 352); and the compressed frame 360 may include multiple macroblock lines (or slices) 362-0, 362-1, . . . , 362-9 (collectively, macroblock lines or slices 362).

In the video management device 106, the MCU 210 may receive the compressed frames 330, 340, 350, and 360 and assemble them in a predetermined composition based one or more inherent feature of the video codec standard in which the compressed frames 330, 340, 350, and 360 are encoded.

Figure 4A:
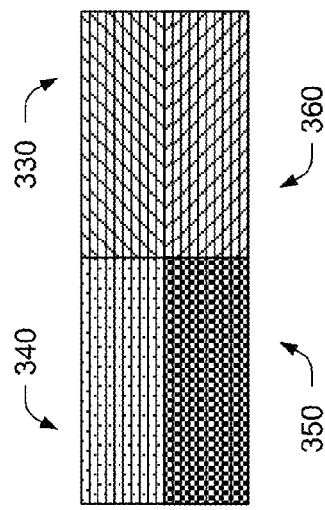
FIGS. 4A-4C illustrate a composite video frame having different compositions generated by the video management device of FIG. 1A, in accordance with an embodiment of the present disclosure.
Figure 4C:
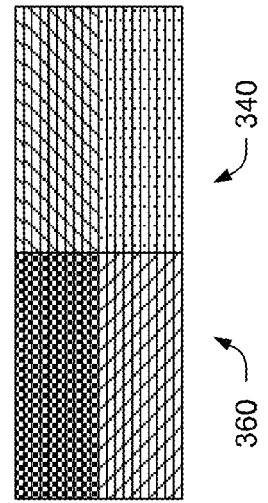
Figure 4B:
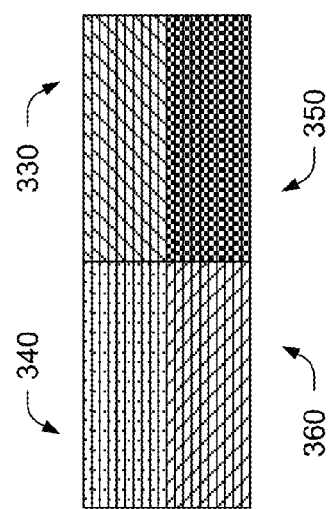

In one example, the MCU 210 may implement flexible macroblock ordering (FMO) technique known in the art to assemble slices from each of the compressed frames 330, 340, 350, and 360 by mapping the corresponding byte-arrays into a predetermined composition, when the video codec standard in which the compressed frames 330, 340, 350, and 360 are encoded supports FMO. In another example, the MCU 210 may assemble the macroblock lines corresponding to each of the compressed frames 330, 340, 350, and 360 into scan lines based on raster scan or interleaved scan to obtain a predetermined composition. Such predetermined composition may be achieved in accordance with at least one of the target terminal such as the terminal 306 and a selected mode (continuous presence mode or voice-switched mode) of the MCU 210 by shifting bits corresponding to each of the macroblock lines or slices to adjust for a macroblock line or slice that begins at a bit within a byte-boundary of the compressed video frames 330, 340, 350, and 360. The assembled slices or macroblock lines are outputted as a composite video stream including a sequence of compressed video frames, each having slices or macroblock lines assembled in the predetermined composition. For example, if each of the compressed frames are made of 160×160 pixels, with each slice or macroblock line having ten macroblocks of 16×16 pixels, then a composite video frame 370 may be made of 320×320 pixels having a first set of compressed frames comprising of the compressed frames 330 and 340 may be arranged over a second set of compressed frames comprising of the compressed frames 350 and 360. Other exemplary compositions for the compressed video frame 370 are illustrated in FIGS. 4A-4C.

Such assembling of the compressed video frames 330, 340, 350, and 360 substantially reduces the computation or processing cost of the MCU 210 and may require the resized video frames, such as the frame 308, to be encoded only once if a change in spatial or motion information occurs in another frame of the composite video frame 370. An example of this use would be a video stream of a news cast taking up the top ¾ of the target video streams, with the bottom ¼ containing a different ticker for different screens, containing information specific to this display, but not requiring the news-cast to be encoded multiple times.

Thus, the video management device 106 facilitates to provide output composite video streams based on encoded-realm composition, rather than raw-bitmap realm composition, thereby saving a considerable amount of computing power on re-encoding the same video frame in multiple layouts for multiple users. Further, the video management device 106 avoids scaling of the video stream at a receiving terminal to cause a poor quality display, since the composite video stream is already scaled to the exact required resolution supported by the receiving terminal. Additionally, the video management device 106 provides either an MCU with an improved computing capacity to support a relatively greater number of video streams or implement a low-cost MCU having the computing capacity to support the same number of video streams.

To summarize, one embodiment of the present disclosure includes an apparatus for improving performance of a multipoint control unit. The apparatus comprises a video stream manipulator and a multipoint control unit. The video stream manipulator may be configured to encode one or more video streams in a predetermined video codec standard separately. Each of said encoded one or more video streams includes an encoded video frame made of a plurality of macroblocks. Each of said plurality of macroblocks may be segregated into a predetermined number of macroblock lines. The multipoint control unit may be configured to assemble said predetermined number of macroblock lines from each of said encoded one or more video streams in a predetermined composition.

Another embodiment of the present disclosure includes a method to use an apparatus for improving performance of a multipoint control unit. The method comprises encoding one or more video streams in a predetermined video codec standard separately with a video stream manipulator, wherein each of said encoded one or more video streams comprises an encoded video frame made of a plurality of macroblocks, each of said plurality of macroblocks being segregated into a predetermined number of macroblock lines; and assembling said predetermined number of macroblock lines from each of said encoded one or more video streams in a predetermined composition with said multipoint control unit.

Yet another embodiment of the present disclosure includes a method to manufacture an apparatus for improving performance of a multipoint control unit. The method comprises providing a video stream manipulator configured to encode one or more video streams in a predetermined video codec standard separately, wherein each of said encoded one or more video streams comprises an encoded video frame made of a plurality of macroblocks, each of said plurality of macroblocks being segregated into a predetermined number of macroblock lines; and providing said multipoint control unit configured to assemble said predetermined number of macroblock lines from each of said encoded one or more video streams in a predetermined composition.

Still another embodiment of the present disclosure includes a non-transitory program storage device readable by a computing device that tangibly embodies a program of instructions executable by said computing device to perform a method for improving performance of a multipoint control unit. The method comprises encoding one or more video streams in a predetermined video codec standard separately with a video stream manipulator, wherein each of said encoded one or more video streams comprises an encoded video frame made of a plurality of macroblocks, each of said plurality of macroblocks being segregated into a predetermined number of macroblock lines; and assembling said predetermined number of macroblock lines from each of said encoded one or more video streams in a predetermined composition with said multipoint control unit.

Other embodiments of the present invention will be apparent to those ordinarily skilled in the art after considering this disclosure or practicing the disclosed invention. The specification and examples above are exemplary only, with the true scope of the present invention being determined by the following claims.

We claim the following:

1. A video management device that enhances the performance of a multipoint control unit that encodes and decodes video streams, comprising:
    a processor with memory, said processor executes software instructions that provide the following functions:
        an interface that connects to the terminals that provide or receive one or more video streams;
        a video stream manipulator that uses encoded-realm composition, said video stream manipulator receives the video streams and processes each video stream separately, said video stream manipulator scales or resizes each video stream as needed, said video stream manipulator encodes each video stream in a predetermined video codec standard, wherein the encoded video stream comprises an encoded video frame made of a plurality of macroblocks, each of said plurality of macroblocks being segregated at the bit level into a predetermined number of macroblock lines; and
        a multipoint control unit configured to assemble said predetermined number of macroblock lines from the encoded video stream in the encoded-realm composition.

2. The claim according to claim 1, wherein said predetermined video codec standard is at least one of H.264 standard and H.265 standard.

3. The claims according to claim 1, wherein said encoded video frame is pre-scaled to a resolution supported by a target device.

4. The claim according to claim 1, wherein an aspect ratio of said predetermined number of macroblock lines is different from that of a display screen of a target device.

5. The claim according to claim 1, wherein said predetermined number of macroblock lines comprises an encoded macroblock.

6. A method to use a video management device that enhances the performance of a multipoint control unit that encodes and decodes video streams, comprising:
    providing a processor with memory, said processor executes software instructions to perform the following functions:
        providing or receiving one or more video streams from the terminals using an interface;
        receiving the video streams and processing each video stream separately using a video stream manipulator, said video stream manipulator uses encoded-realm composition, said video stream manipulator scales or resizes each video stream as needed, said video stream manipulator encodes each video stream in a predetermined video codec standard, wherein the encoded video stream comprises an encoded video frame made of a plurality of macroblocks, each of said plurality of macroblocks being segregated at the bit level into a predetermined number of macroblock lines; and
        assembling said predetermined number of macroblock lines from the encoded video streams in the encoded-realm composition with a multipoint control unit.

7. The claim according to claim 6, wherein said video codec standard is at least one of H.264 standard and H.265 standard.

8. The claim according to claim 6, wherein said at least one encoded video frame is pre-scaled to a resolution supported by a target device.

9. The claim according to claim 6, wherein an aspect ratio of said predetermined number of macroblock lines is different from that of a display screen of a target device.

10. The claim according to claim 6, wherein said predetermined number of macroblock lines include at least one encoded macroblock.

11. A method to manufacture improving video management device that enhances the performance of a multipoint control unit encodes and decodes video streams, comprising:
   providing a processor with memory, said processor executes software instructions to perform the following functions:
      providing an interface that connects to the terminals that provide or receive one or more video streams;
      providing a video stream manipulator that uses encoded-realm composition, said video stream manipulator receives the video streams and processes each video stream separately, said video stream manipulator scales or resizes each video stream as needed, said video stream manipulator encodes each video stream in a predetermined video codec standard, wherein the encoded video stream comprises an encoded video frame made of a plurality of macroblocks, each of said plurality of macroblocks being segregated at the bit level into a predetermined number of macroblock lines; and
      providing a multipoint control unit configured to assemble said predetermined number of macroblock lines from the encoded video stream in the encoded-realm composition.

12. The claim according to claim 11, wherein said video codec standard is at least one of H.264 standard and H.265 standard.

13. The claim according to claim 11, wherein said at least one encoded video frame is pre-scaled to a resolution supported by a target device.

14. The claim according to claim 11, wherein an aspect ratio of said predetermined number of macroblock lines is different from that of a display screen of a target device.

15. The claim according to claim 11, wherein said predetermined number of macroblock lines include at least one encoded macroblock.

16. A non-transitory program storage device readable by a computing device that tangibly embodies a program of instructions executable by said computing device to perform a method to use a video management device that enhances the performance of a multipoint control unit that encodes and decodes video streams, comprising:
   providing a processor with memory, said processor executes software instructions to perform the following functions:
      providing or receiving one or more video streams from the terminals using an interface;
      receiving the video streams and processing each video stream separately using a video stream manipulator, said video stream manipulator uses encoded-realm composition, said video stream manipulator scales or resizes each video stream as needed, said video stream manipulator encodes each video streams in a predetermined video codec standard, wherein the encoded video stream comprises an encoded video frame made of a plurality of macroblocks, each of said plurality of macroblocks being segregated at the bit level into a predetermined number of macroblock lines; and
      assembling said predetermined number of macroblock lines from the encoded video stream in the encoded-realm composition with a multipoint control unit.

17. The claim according to claim 16, wherein said video codec standard is at least one of H.264 standard and H.265 standard.

18. The claim according to claim 16, wherein said at least one encoded video frame is pre-scaled to a resolution supported by a target device.

19. The claim according to claim 16, wherein an aspect ratio of said predetermined number of macroblock lines is different from that of a display screen of a target device.

20. The claim according to claim 16, wherein said predetermined number of macroblock lines include at least one encoded macroblock.

* * * * *